Patented Mar. 19, 1935

1,995,117

UNITED STATES PATENT OFFICE 1,995,117

PROCESS FOR TREATING CELLULOSE NITRATE

Roderick K. Eskew, East Orange, N. J., assignor to Dupont Viscoloid Company, Wilmington, Del., a corporation of Delaware No Drawing. Application December 16, 1933, Serial No. 702,791

8 Claims. (Cl. 260—148)

This invention relates to the treatment of cellulose nitrate and, more particularly, to the removal of fines and acid from the cellulose nitrate as an integral part of the stabilization or purification treatment customarily given to cellulose nitrate in its manufacture.

It is the practice at present, after nitrating cellulose in any of the accepted ways, to remove the excess acid by some means, such as centrifuging, then to drown the cellulose nitrate in excess water and thereafter to give the cellulose nitrate a purification or stabilization treatment, such as steeping in hot acid water, or acid salt solution, or boiling at atmospheric pressure in acid water, digesting under pressure, bleaching, et cetera. After the purification or stabilization treatment is completed the cellulose nitrate is given repeated washings with water, which is allowed to drain off down through the cellulose nitrate until the last traces of acid, or in the case of cellulose nitrate which has been bleached, the last traces of bleaching agent, have been removed.

This treatment outlined above gives a cellulose nitrate which could be considerably improved as to clarity, both in solution and colloided form. Particularly is this so with respect to cellulose nitrate which has been given a thorough boiling in acid water and is to be used where clarity of the cellulose nitrate in colloided form is of prime importance.

With the recent extensive use of 11% nitrogen cellulose nitrate in the form of a thin, transparent, inter-layer of plastic sandwiched between plates of glass to give so-called safety glass for use in automobile wind shields, and the like, there has arisen a necessity for obtaining the highest possible clarity of the transparent sheet and an improved resistance to discoloration by light. This last property has been obtained to an appreciable degree by a more drastic purification or stabilization of the cellulose nitrate, as for example, substituting a four hour boil in acid water of approximately 1% strength instead of the mild steeping of two or three hours at a temperature of about 82° C. in acid water of about 0.25% strength. This more thorough purification or stabilization process, although resulting in improved stability of the cellulose nitrate, causes an increase in the haziness of the colloided sheet from such cellulose nitrate. It has been determined that this is largely caused by fines, which are small particles varying in size from a maximum dimension of 0.035 millimeter down to those so small as to be individually distinguishable only under the ultramicroscope. It has been determined that these fines arise from a number of sources, as for example, the fine dust always present in cotton linters which is difficult of nitration, fibers not completely nitrated, or cellulose denitrated during the centrifuging of the acid subsequent to nitration, as well as to degraded cellulose products generated by the hydrolysis of the unstable esters during the dilute acid purification treatment. This last named factor is of preponderating importance in contributing to the presence of fines when a more thorough boiling treatment is given the cellulose nitrate, as is the practice today in making cellulose nitrate for safety glass.

It has further been determined that the ordinary washing given to the cellulose nitrate according to practices heretofore used, fails to eliminate these fines which cause the objectionable cloudiness of the cellulose nitrate in solution or in colloided form.

An object of the present invention is to provide a process whereby cellulose nitrate may be produced having an exceptionally high degree of clarity in solution or in colloidal form. A further and more specific object is to provide a process whereby cellulose nitrate which has been subjected to a severe acid water boil may be obtained in solution or in colloided form having a high degree of clarity. A still further object of the invention is to thoroughly remove the fines produced during the purification treatment of the cellulose nitrate.

The above objects are accomplished according to the present invention by suspending the cellulose nitrate, after the stabilization boil has been completed, in an aqueous liquid having a pH value of at least about 3.5, and preferably between 3.5 and 6.5, whereby the fines will be separated from the relatively long fibered cellulose nitrate, allowing the relatively long fibered cellulose nitrate to settle, and decanting the aqueous liquid while the fines are still in a state of suspension.

The fines are not only extremely small in size but are colloidal in nature, and furthermore, under certain conditions they are so strongly absorbed upon the surface of the stable cellulose nitrate as to be impossible of removal using ordinary washing methods. Also, even if the fines should be removed from the stable cellulose nitrate during washing, they will again be caught on the mass of stable cellulose nitrate which merely acts as a filtering medium upon which the fines can deposit.

It has now been discovered that, if the cellulose nitrate is washed with water having a pH value above 3.5, and more particularly between 3.5 and 6.5, the fines are released from the stable cellulose nitrate and are suspended in the wash waters, and that furthermore, whereas the relatively long fibered cellulose nitrate deposits rapidly from the wash water, generally in two or three minutes, the fines stay in suspension for a considerable period and, by decanting the wash waters, the fines are thus separated from the stable cellulose nitrate. The term "decant" is used herein and in the claims in its broader sense to mean the removal of the supernatant liquid from a sediment in any known manner, as contrasted with a simple filtering step, such as draining the wash waters down through the cellulose nitrate and out the bottom of the vessel containing same. Mere draining off of the wash waters from the bottom of the vessel must be avoided, because as pointed out above, the fines will be deposited again on the cellulose nitrate if a simple filtering is employed.

The process of the present invention is preferably carried out by washing the cellulose nitrate from the purification or stabilization treatment, as ordinarily done, until the acid retained in the cellulose nitrate is just sufficient to give a pH value of 3.5 or above to wash water added to the cellulose nitrate in an amount approximately 30 times the weight of the cellulose nitrate. If desired, the pH value may be otherwise adjusted, as by adding alkali or acid, depending upon which is necessary. The entire mass of cellulose nitrate and water is now agitated and allowed to settle for a few minutes, the heavier, relatively long fibered cellulose nitrate settling to the bottom, and the superatant milky waters containing the suspended fines are then drawn off through a pipe, the open end of which is made adjustable to the changing level of the liquids by means of a swinging elbow, telescoping device, or similar means well known in the art. Fresh wash water is added, the cellulose nitrate mass agitated again, settled, and the supernatant liquid again drawn off. This process is repeated until the wash water drawn off is practically free of the cloudiness caused by the suspended fines, at which time it will be found that the stable cellulose nitrate is likewise substantially free of the last traces of acid.

Rather than drawing off the supernatant liquid by means of a pipe, such as described above, it may be continuously removed by a hexagonal, rotating bailer washer of any standard design and fresh wash water continuously introduced at a level below that of the rotating screen, preferably near the bottom of the washing tub. The fresh wash water is introduced at a rate to keep the level of the liquid in the washing tub substantially constant and the process is continued until the wash water being removed by the bailer is substantially free of the milkiness caused by the fines in suspension.

The following examples are given in order to illustrate specific embodiments of the present invention:—

Example 1.—Cellulose nitrate of approximately 11% nitrogen content is boiled for four hours in acid of about ½% strength, expressed as $H_2SO_4$. At the end of the boil the acid water is removed by bottom drainage and the cellulose nitrate is given two washes with bottom drainage. It is then covered with about thirty times its weight of water and agitated for a period of about twenty minutes to permit the acid to diffuse out of the cellulose nitrate and to suspend the fines which will have been liberated from the surface of the cellulose nitrate in this wash because the pH will then be between 3.5 and 4.0. After stopping the agitation, the bulk of the coarse cellulose nitrate is permitted to settle for two or three minutes. The decant pipe is then lowered into the milky supernatant liquor as rapidly as the settling cellulose nitrate will permit, until the supernatant liquor is withdrawn. The tub is again filled with water and the operation repeated until the wash waters are substantially free from milkiness, at which time the acid will ordinarily be completely removed.

Example 2.—Cellulose nitrate of approximately 12.2% nitrogen is boiled 16 hours in water having an acidity of 1.0%, expressed as $H_2SO_4$. At the end of the boil some of the acid is removed by bottom drainage and the cellulose nitrate is given three washes with bottom drainage. It is then covered with about 30 times its weight of water, which after a few minutes contact will have a pH of approximately 3.5. At this time the colloidal fines will be released from the coarse cellulose nitrate and suspended in the wash waters. A hexagonal rotating bailer washer of standard design, such as is well known in the industry, is immersed part way below the liquor and operated until the wash waters are free from milkiness, at which time the cellulose nitrate will also be free from acid. Water to replace that being withdrawn by the bailer will be introduced during washing, preferably below the liquid level, and at such a rate as to keeep the liquid level substantially constant. The screen covering the bailer should be of acid resistant metal, such as chromium steel, and its mesh should be sufficiently coarse to permit the fines to escape readily without losing too much of the long fibered pyroxylin.

The above examples are merely illustrative of the invention, which is broadly applicable to all types of cellulose nitrate subsequent to the purification or stabilization boil. The process is particularly adapted to the manufacture of cellulose nitrate where clarity in colloided form or solution is of importance, the more drastic the purification treatment given, the more necessary it being to remove the fines to get a product of satisfactory clarity. The cellulose nitrate may be made from cellulose in any of the usual forms, such as cotton linters or wood pulp in the form of shredded sheets, chips, and the like.

As long as the pH of the wash water is above 3.5, the fines will be released from the larger particles of cellulose nitrate, but it is preferable to have an initial pH of 3.5–4.0. The amount of wash water added may be varied widely, although practice shows that a ratio of water to cellulose nitrate of about 30 to 1 is most suitable. More water may be used and a ratio of 40 to 1 is quite practical, but nevertheless, the use of more water is generally slightly more inconvenient. If less water is used, the complete removal of the fines will take more washes or a longer continuous wash, if a continuous process is being used.

Obviously the invention is not to be limited to the specific means of withdrawing the wash water disclosed in the examples. Any means that will remove the wash waters with suspended fines, without allowing the water to drain down through the cellulose nitrate that has settled, may be used.

The present invention provides an extremely simple and economical method of getting a cellulose of decidedly improved clarity and is of great advantage in the production of cellulose nitrate for inter-layers in safety glass, or the many other uses which require a cellulose nitrate having a high degree of clarity. The process is particularly valuable where the cellulose nitrate is given a severe acid water boil, as is now being done more and more in an effort to get a stable product. This boiling increases appreciably the amount of fines, which, however, are present in a considerable amount in cellulose nitrate subjected to any of the usual stabilization or purification treatments.

While heretofore decantation washing has been used in the cellulose nitrate industry, it has never been used in the particular method of the present invention, and such former uses where the removal of the fines and acid were in no way contemplated are not to be confused with the present invention, primarily and carefully adapted, by means of pH control, to secure a complete removal of the fines.

As many apparently widely different embodiments of this invention may be made without departing from the spirit and scope thereof, it is to be understood that the invention is not limited to the specific embodiments thereof except as defined in the appended claims.

I claim:

1. In the manufacture of cellulose nitrate wherein cellulose is nitrated, the excess acid removed, and the resulting cellulose nitrate is purified by boiling with dilute acid or by other purification or stabilization means, the process which comprises suspending the cellulose nitrate, after the stabilization boil has been completed, in an aqueous liquid having a pH value of about 3.5 whereby the fines will be separated from the relatively long fibered cellulose nitrate, allowing the relatively long fibered cellulose nitrate to settle, and decanting the aqueous liquid containing the fines in suspension.

2. In the manufacture of cellulose nitrate wherein cellulose is nitrated, the excess acid removed, and the resulting cellulose nitrate is purified by boiling with dilute acid or by other purification or stabilization means, the process which comprises suspending the cellulose nitrate, after the stabilization boil has been completed, in an aqueous liquid having a pH value of 3.5–6.5 whereby the fines will be separated from the relatively long fibered cellulose nitrate, allowing the relatively long fibered cellulose nitrate to settle, and decanting the aqueous liquid containing the fines in suspension.

3. In the manufacture of cellulose nitrate wherein cellulose is nitrated, the excess acid removed, and the resulting cellulose nitrate is purified by boiling with dilute acid or by other purification or stabilization means, the process which comprises suspending the cellulose nitrate, after the stabilization boil has been completed, in an aqueous liquid having a pH value of about 3.5 whereby the fines will be separated from the relatively long fibered cellulose nitrate, allowing the relatively long fibered cellulose nitrate to settle, decanting the aqueous liquid containing the fines in suspension, adding water to the cellulose nitrate, again allowing the relatively long fibered cellulose nitrate to settle, decanting the water containing the fines in suspension, and repeating said last three steps until the decanted water is substantially free from milkiness caused by the fines in suspension.

4. In the manufacture of cellulose nitrate wherein cellulose is nitrated, the excess acid removed, and the resulting cellulose nitrate is purified by boiling with dilute acid or by other purification or stabilization means, the process which comprises suspending the cellulose nitrate, after the stabilization boil has been completed, in an aqueous liquid having a pH value of 3.5–6.5 whereby the fines will be separated from the relatively long fibered cellulose nitrate, allowing the relatively long fibered cellulose nitrate to settle, decanting the aqueous liquid containing the fines in suspension, adding water to the cellulose nitrate, again allowing the relatively long fibered cellulose nitrate to settle, decanting the water containing the fines in suspension, and repeating said last three steps until the decanted water is substantially free from milkiness caused by the fines in suspension.

5. In the manufacture of cellulose nitrate wherein cellulose is nitrated, the excess acid removed, and the resulting cellulose nitrate is purified by boiling with dilute acid or by other purification or stabilization means, the process which comprises suspending the cellulose nitrate, after the stabilization boil has been completed, in an aqueous liquid having a pH value of 3.5–4.0 whereby the fines will be separated from the relatively long fibered cellulose nitrate, allowing the relatively long fibered cellulose nitrate to settle, decanting the aqueous liquid containing the fines in suspension, adding water to the cellulose nitrate, again allowing the relatively long fibered cellulose nitrate to settle, decanting the water containing the fines in suspension, and repeating said last three steps until the decanted water is substantially free from milkiness caused by the fines in suspension.

6. In the manufacture of cellulose nitrate wherein cellulose is nitrated, the excess acid removed, and the resulting nitrate is purified by boiling with dilute acid or by other purification or stabilization means, the process which comprises suspending the cellulose nitrate, after the stabilization boil has been completed, in an aqueous liquid having a pH value of about 3.5 whereby the fines will be separated from the relatively long fibered cellulose nitrate, allowing the relatively long fibered cellulose nitrate to settle, and continuously decanting the aqueous liquid containing the fines in suspension while continuously supplying water at a level of the liquid below that at which decantation is taking place and at a rate to maintain a substantially constant liquid level, said decanting and adding of water being continued until the decanted liquid is substantially free of the milkiness caused by the fines in suspension.

7. In a manufacture of cellulose nitrate wherein cellulose is nitrated, the excess acid removed, and the resulting nitrate is purified by boiling with dilute acid or by other purification or stabilization means, the process which comprises suspending the cellulose nitrate, after the stabilization boil has been completed, in an aqueous liquid having a pH value of 3.5–6.5 whereby the fines will be separated from the relatively long fibered cellulose nitrate, allowing the relatively long fibered cellulose nitrate to settle, and continuously decanting the aqueous liquid containing the fines in suspension while continuously supplying water at a level of the liquid below that at which decantation is taking place and at a rate to maintain a substantially constant liquid level, said decanting and adding of water being continued until the decanted liquid is substantially free of the milkiness caused by the fines in suspension.

8. In the manufacture of cellulose nitrate wherein cellulose is nitrated, the excess acid removed, and the resulting nitrate is purified by boiling with dilute acid or by other purification or stabilization means, the process which comprises suspending the cellulose nitrate, after the stabilization boil has been completed, in an aqueous liquid having a pH value of 3.5–4.0 whereby the fines will be separated from the relatively long fibered cellulose nitrate, allowing the relatively long fibered cellulose nitrate to settle, and continuously decanting the aqueous liquid containing the fines in suspension while continuously supplying water at a level of the liquid below that at which decantation is taking place and at a rate to maintain a substantially constant liquid level, said decanting and adding of water being continued until the decanted liquid is substantially free of the milkiness caused by the fines in suspension.

RODERICK K. ESKEW.